United States Patent Office 2,961,398
Patented Nov. 22, 1960

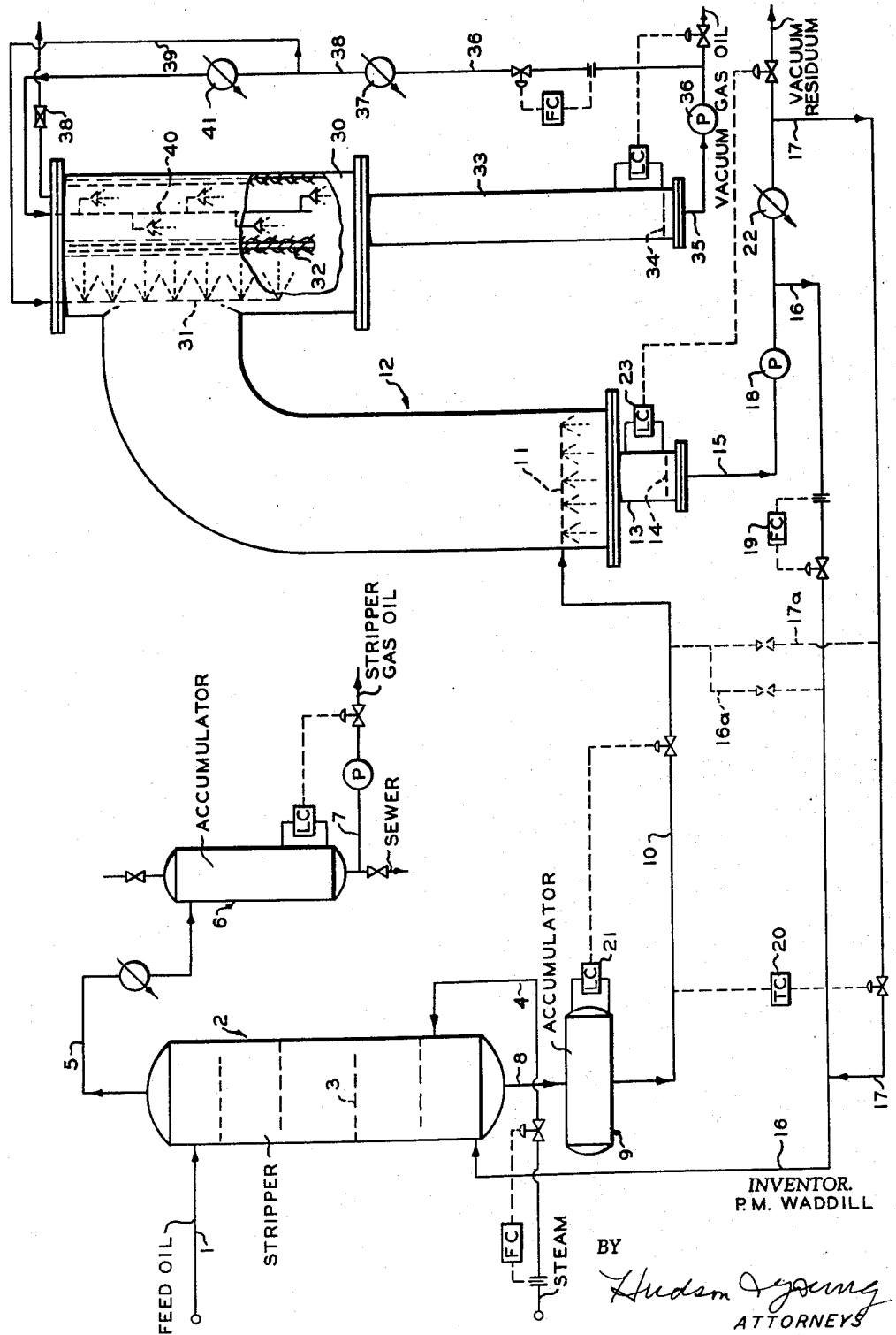

2,961,398

DISTILLATION METHOD AND APPARATUS

Paul M. Waddill, Bartlesville, Okla., assignor to Phillips Petroleum Company, a corporation of Delaware Filed Mar. 10, 1958, Ser. No. 720,176

21 Claims. (Cl. 208—366)

This invention relates to a method of distillation. It also relates to a distillation apparatus. In one of its aspects, the invention relates to distillation of a distillable material by flashing the same, preferably at reduced pressure, into the bottom of a substantially vertically disposed, elongated flashing zone from which unvaporized residue is withdrawn at a bottom portion and passing vapors produced upwardly and turning them through an angle of about 90° into an adjacent condensing zone wherein the vapors are condensed. In another of its aspects, the invention relates to a combination condensing and guard chamber into which the vapors from the flashing zone are passed, the vapors being contacted with a substantially vertically disposed spray adapted to cause the vapors to condense and to aid their impingement upon a dividing member arranged to cause general vapor flow to be downwardly in said condensing section around the bottom of the dividing member and upwardly through a further cold spray for condensing of any vapors not condensed by the first-mentioned spray and impingement. In another of its aspects, the invention relates to such a condensing and guard chamber in which the dividing element and the guard chamber are lined with a wire mesh increasing the efficiency of the condensing which takes place in both portions of the apparatus. In a further aspect of the invention, it relates to method and apparatus as already described further characterized in that unvaporized residue is returned to the flashing vessel either directly or by way of a stripping zone to which the feed to the flashing zone is first fed, as later described. In a further aspect still, the invention is concerned with combinations of flow control based either upon flow rates or temperatures or a combination of both.

The art of distillation, especially of organic materials, such as oils, chemicals, and the like, is well developed. However, the art of flash distillation is continually being developed and it appears that more efficient, yet simplified methods and apparatus, are highly desired. One of the main problems in flash distillation, especially of residual oils, such as hydrocarbon oils, is that of obtaining the lowest possible pressure drop gradient across the apparatus. Another problem is the avoidance of entrainment of unvaporized residual material. Still further, constantly being sought are methods and means whereby to reduce the cost of operation and maintenance of such methods and equipment.

It is an object of this invention to provide a method and apparatus for distillation of a distillable material. It is another object of the invention to provide method and means for flash distilling a distillable material, such as an oil, in combination of steps and apparatus whereby efficient handling at low cost is obtained. Another object of the invention is to provide a novel combination of a flashing zone or vessel with a condensing and guard zone or vessel. Still further, it is an object of this invention to provide a novel condensing method and/or zone in which the functions of condensing and guarding against escape of condensable vapors are effected. A further object of the invention is the provision of method and means for efficiently stripping and flash distilling of a distillable material, such as a hydrocarbon oil.

Other aspects, objects and the several advantages of the invention are apparent from this disclosure, the drawing and the appended claims.

According to the present invention, there is provided a method and apparatus for flashing a distillable material in a bottom portion of a substantially vertically disposed elongated flashing zone, passing vapors thus produced upwardly, turning said vapors through an angle of about 90° and passing said vapors into a condensing zone, as described later herein. Also, according to the invention, apparatus providing a flashing vessel and a condensing vessel, in combination, possessing features, as described herein, has been provided.

Also, according to the invention, there has been provided a condensing and a guard chamber of design facilitating rapid and efficient condensing and recovery of vapors, the chamber consisting essentially of two sections, a condensing section for condensing vapors as these emanate from a flashing zone or vessel and another section for condensing more difficultly condensable vapors, the said sections being divided by a downwardly extending partition or baffle element, there being provided also an inlet into one of siad sections for the vapors, a spray in said one of said sections blanketing the vapor entrance, a withdrawal pipe at the bottom of the apparatus and a spray in the other of the sections adapted to condense any uncondensed vapors which pass around the bottom of the downwardly extending baffle member.

Referring now to the drawing, about 53 barrels per hour of a thermally cracked hydrocarbon residual oil testing 15° API and at a temperature of 800° F. are introduced by pipe 1 into stripper 2, equipped with stripping trays 3. About 1,100 pounds per hour of 20 p.s.i.g. exhaust steam are introduced by pipe 4 into stripper 2. Downwardly flowing oil is stripped as it flows over the trays and from tray to tray. The top of the stripper runs about 750° F. and 5 p.s.i.g., the bottom temperature is about 680° F. Overhead is taken off by pipe 5 to stripper accumulator 6 from which 21 barrels per hour of 22° API gas oil at about 200° F. (21 barrels of oil and about 3 barrels of steam condensate in emulsified form) are recovered by pipe 7. The flow of the gas oil mixture from vessel 6 is controlled by a level controller and is aided by the pump in pipe 7. This gas oil is preferably separated from the water and then further cracked or to otherwise treat it as desired. Bottoms from stripper 2 are passed by pipe 8 to keg 9 and from keg 9 by pipe 10 to spray header 11 in the lower end of flashing vessel 12. The downwardly sprayed oil is flashed in the bottom of vessel 12 which is at 650° F. temperature and 7.5 mm. mercury pressure. The unvaporized portion of the oil is collected in leg portion 13 and drawn off through vortex breaker 14 and pipe 15. Of 53 barrels per hour of residue so drawn off, 21 barrels per hour are recovered from the system and 32 barrels per hour are returned to stripper 2 by pipes 16 and 17. This vacuum residue tests 7° API with a penetration of 150 at 77° F. It has a specific gravity at 650° F. of 0.83 and a viscosity of 650° F. of 0.6 centipoise. Pump 18 supplies the necessary pressure to return the residuum to vessel 2 with a head of 250 feet. To permit operation, as desired according to the invention, flow recorder controller 19 and temperature recorder controller 20 regulate between them the total residue returned to vessel 2 to maintain therein the desired amount of returned heat. Liquid level controller 21 controls the level in keg 9. A heat exchanger 22 controls the temperature of the residue cycled through pipe 17. It will be noted that heat is actually cycled to stripper 2 and from it to flashing vessel 12, since the residue ultimately is returned to vessel 12. Level controller 23 controls the flow of residue from the system.

The vapors rising in vessel 12 are curved around a

90° angle into vessel 30. This vessel is joined to vessel 12 at the side, as shown. It is noted that the vapors pass through a condensing spray 31 located in the condensing zone and are caused, as they condense, to impinge upon partition or divider baffle 32. The spray 31 blankets the entire inlet so that the vapors are thoroughly mixed with sprayed condensate liquid obtained as later described. The impingement against element 32 which, in this example, is equipped with a one-inch thick wire mesh, greatly assists in the efficient condensation of vapors. Condensate is collected in and removed from barometric leg 33 through vortex breaker 34, pipe 35, pump 36 and pumped by way of pipe 36, spray cooler 37, pipe 38 and branch pipe 39 to spray 31. Uncondensed vapors in vessel 30 pass around the bottom of element 32, this, according to the invention, assists in avoiding entrainment of droplets, and are further condensed while rising on the right side of the partition by downwardly oriented spray 40 to which cold condensate is fed by pipe 38. With the method and apparatus of the invention, it is possible to obtain quite satisfactory condensing of the condensable portion of the vapors obtaining 17° API vacuum gas oil, sent to cracking, at a rate of 11 barrels per hour, and cycling only 5 barrels per hour of 120° F. condensate to spray 40 and only 50 barrels per hour 215° F. condensate to spray 31. These 55 barrels per hour obtained at approximately 335° F. are first cooled at 37 to 215° F. and the 5 barrels per hour only are further cooled in cooler 41. To increase the efficiency of the guard section on the right side of partition 32, the guard section is lined with one-inch thick wire mesh, as indicated.

As a modification, especially when the stripper 2 is not used, the residue from vessel 12 is returned directly, in part, to vessel 12 by alternate pipes 16A and 17A.

Although the drawing has been described in some detail, it should be understood that design and construction of a unit would involve the consideration of various elements of operation and apparatus, usually provided by one skilled in the art.

To provide some detail with respect to the present embodiment, the stripper vessel is 4 feet in diameter by 15 feet high, and contains four stripping trays to produce the vacuum flasher feed substantially free of noncondensibles. Each of the four trays is perforated along its overflow edge for the purpose of breaking up the liquid to obtain better contact of the downflowing oil and upflowing stripping vapors.

The condensed overhead from the feed stripper is a heavy oil-water emulsion (about 21 barrels of oil and 3 barrels of water) which does not readily separate into an oil phase and a water phase. It is preferred to break this emulsion by conventional desalting methods prior to charging the feed stripper overhead condensate to subsequent operations, e.g., catalytic cracking.

The flashing vessel 12 is 3 feet in diameter by 25 feet high and the condensing-guard vessel is 3 feet in diameter by 7 feet 9½ inches high. The 90° connecting elbow is 3 feet in diameter on a radius of 3 feet. The leg 33 on the vessel 30 is 1 foot in diameter and about 27 feet high.

The guard section of vessel 30, using sprays 40, provides a guard on the vacuum ejectors 38 to condense any light hydrocarbons not condensed by the condensing sprays 31. The divider plate 32 is ¼ inch thick and serves to separate the condensing section and the guard section. Wire mesh one inch thick is fastened to both sides of this plate and around the shell of the guard section to catch spray and provide a surface for drainage of liquid therefrom.

While the invention has been described in connection with an example specific to a cracked oil (cracked topped crude oil), it will be evident to those skilled in the art that the method and apparatus are adaptable or applicable to the distillation of other oils (topped crude oil, visbroken residuum, etc.) or organic materials to separate them from solvents in which they may be contained, to the distillation of mixtures of organic materials, or the distillation of fruit and/or vegetable juices and the like.

*Tabulation of data*

Fresh charge 1:
   Cracked topped crude residuum—
      Barrels per hour _____ 53
      API @ 60/60° F _____ 15
      Temperature, ° F _____ 800
Recycle vacuum residuum 36:
   Barrels per hour _____ 32
   API @ 60/60° F _____ 7
Stripper gas oil 7:
   Barrels per hour (less water) _____ 21
   API @ 60/60° F _____ 22
   Temperature, ° F _____ 200
Stripper bottoms 8:
   Barrels per hour (includes recycle) _____ 64
   API @ 60/60° F _____ 8.3
   Temperature, ° F _____ 680
Vacuum gas oil 35:
   Barrels per hour (includes recycle) _____ 66
   API @ 60/60° F _____ 17
   Temperature, ° F _____ 335
Vacuum residuum 15:
   Barrels per hour (includes recycle) _____ 53
   API @ 60/60° F _____ 7
   Temperature, ° F _____ 650
   Penetration @ 77° F., 5 sec., 100 gm ____ 150
   R & B softening point, ° F _____ 103
Vacuum gas oil condensing spray 31:
   Barrels per hour _____ 50
   Temperature, ° F _____ 215
Vacuum gas oil guard spray 40:
   Barrels per hour _____ 5
   Temperature, ° F _____ 120
Stripper 2:
   Pressure, p.s.i.g. _____ 5
   Temperature (top), ° F _____ 750
Vacuum flasher 12:
   Pressure at flash, mm. Hg abs _____ 7.5
   Temperature at flash, ° F _____ 650
Condensing zone of 30:
   Pressure, mm. Hg abs _____ 5
   Temperature of spray, ° F _____ 215
Guard zone of 30:
   Pressure, mm. Hg abs _____ 5
   Temperature of spray, ° F _____ 120

Reasonable variation and modification are possible within the scope of the foregoing disclosure, drawing and the appended claims to the invention, the essence of which is that there have been provided a method and apparatus for efficiently stripping and/or vacuum distilling a distillable liquid, for example, a cracked hydrocarbon oil, by stripping the same in a stripping zone or vessel and/or by flashing the same in a substantially vertically disposed flashing zone or vessel, turning the vapors produced through an angle of 90° and passing them into a vertically disposed condensing section divided into a condensing zone and a guard zone, each provided with sprays, as described, returning unvaporized residue from the flashing vessel to the stripping zone, when employed, and then to the flashing vessel, or directly to said flashing vessel to return heat to said stripping zone and/or flashing vessel, as described, the apparatus providing features according to the invention as set forth and described permitting efficient operation as set out herein.

I claim:

1. A method for distilling a distillable material which comprises feeding said material under distilling conditions into a lower portion of an upwardly extended elongated unobstructed flashing section of a distillation zone forming upwardly rising vapors and unvaporized residue, withdrawing unvaporized residue from the bottom of the said flashing section, conveying the upwardly rising vapors to the top of said elongated flashing zone, at the top of said elongated flashing zone turning said vapors through an angle of about 90° without substantial diminution of the cross-section of the same and then passing said vapors into a substantially vertical condensing section, in said condensing section contacting said vapors with a condensing spray, passing condensing vapors and sprayed liquid downwardly in said vertically disposed condensing section accumulating condensate in the bottom of said condensing section, withdrawing condensate from the bottom of said condensing section, passing uncondensed vapors upwardly through a vertically disposed guard portion of said condensing section, in said guard section contacting uncondensed vapors with guard spray, and removing uncondensed gases from the top of said guard section.

2. A distillation as described in claim 1 wherein a condensing section is provided with a spraying section in which the spray is oriented in substantially the direction of flow of the vapors entering the condensing section from the flashing section and wherein the guard spray in the guard section is oriented downwardly.

3. A distillation according to claim 1 wherein the material being distilled is a topped crude and the distillation is conducted under high vacuum.

4. An apparatus for distilling a distillable material which comprises a vertically disposed elongated unobstructed flashing section, a vertically disposed condensing and guard chamber positioned substantially above the lower end of said flashing section and to one side thereof, a curved section having substantially the same cross-sectional area as said flashing section subtending an angle of approximately 90° connecting the top of said elongated flashing section with one side of said condensing and guard section, a downwardly extending partition in said condensing and guard section forming a condensing zone to one side of the partition and a guard zone to the other side of the partition, a spray means adapted to spray condensing fluid into vapors rising upwardly through said flashing section and being directed into the side of said condensing zone at which place said curved section is connected to said condensing and guard section, a spray means for spraying a condensing fluid into the guard zone, and means for withdrawing condensate from the bottom of said condensing and guard section.

5. An apparatus according to claim 4 wherein the condensing spray is oriented toward said partition in a manner to provide a spray travelling substantially in the direction of the vapors as these enter the condensing zone.

6. An apparatus according to claim 4 wherein the spray in the guard zone is oriented downwardly, and a vacuum source is attached to the top of the guard zone.

7. An apparatus according to claim 4 wherein the partition in the condensing guard section extends downwardly almost to the bottom of said last-mentioned section and is provided with a wire mesh surface.

8. A distillation apparatus comprising a vertically disposed substantially elongated unobstructed flashing vessel, the upper end of said flashing vessel being curved around about 90° to present a substantially horizontal outlet, the horizontal section of said vessel having substantially the same cross-sectional area as said vertical section, a vertically disposed substantially elongated condensing vessel disposed adjacent the outlet of the flashing vessel, said outlet communicating with said condensing vessel at one side thereof.

9. A distillation apparatus according to claim 8 comprising means for feeding a distillable material into the lower end of the flashing vessel and means in each of said flashing and condensing vessels for removing liquid from the bottoms thereof.

10. An apparatus according to claim 9 wherein the condensing vessel is provided with condensing means adapted to provide a spray of condensing fluid extending in said condensing vessel substantially across said outlet.

11. An apparatus according to claim 10 wherein the spray is oriented in the direction of travel of the vapors passing from said outlet into the condensing vessel.

12. An apparatus according to claim 11 wherein the condensing vessel is provided with a partition extending therein from the top thereof downwardly toward but not quite to the bottom but extending below the lowest point at which the said outlet communicates with said condensing vessel, dividing said vessel into two sections, a condensing section and a guard section, the condensing section being on that side of the partition which communicates with said distillation vessel through said outlet and on the guard side being connected to a suction source at the upper end of said condensing vessel.

13. An apparatus according to claim 12 wherein there is provided in the guard side of said condensing vessel a condensing spray means.

14. An apparatus according to claim 13 wherein the spray means in the guard side of said condensing vessel is substantially downwardly oriented.

15. An apparatus according to claim 14 wherein said condensing vessel is provided with a barometric leg and liquid removal flow control means for providing in said barometric leg a desired height of condensate.

16. A method for distilling a thermally cracked oil testing about 15° API comprising gas oil and residual oil constituents which comprises preheating said oil to approximately 800° F., flashing said oil into the upper portion of a stripping zone maintained at about 750° F. and 5 p.s.i.g., introducing into a lower portion of said stripping zone a stripping steam, stripping downwardly flowing oil in said zone, obtaining an overhead from said zone comprising a lighter gas oil testing about 22° API and steam, recovering said lighter gas oil, obtaining from said stripper a bottoms stream of stripped oil testing about 8.3 API and having a temperature of about 680° F., spraying said oil downwardly into the lower end of a substantially vertically disposed elongated flashing zone maintained at about 650° F. and 7.5 mm. mercury, therein flashing the oil producing a non-vaporized residual liquid and upwardly rising vapors, withdrawing unvaporized residue from the bottom of said flashing zone, cycling at least a portion of said residue to the bottom end of said stripping zone, conducting said upwardly rising vapors a substantial distance upwards and then turning said vapors without substantial diminution of the cross-section of the same through about a 90° angle, thus obtaining vapors travelling substantially horizontally, passing said vapors through a condensing spray zone located in a substantially vertically disposed condensing zone and spraying condensing oil consisting essentially of priorly-obtained, now-cooled condensate in substantially the direction of travel of said vapors, causing said spray and now-condensing vapors intermingled therewith to impinge upon one side of an impingement element dividing said condensing zone and extending from its top to a point below the lowest point at which vapors enter said condensing zone, withdrawing condensed liquid from the bottom of said condensing zone through a barometric leg zone, passing uncondensed vapors around the bottom of said impingement element and upwardly on the other side thereof towards a suction source, spraying a cold condensing spray of liquid consisting essentially of earlier-obtained condensate downwardly into said upwardly rising uncondensed vapors, thus obtaining a further amount of condensate which is withdrawn through said barometric leg zone, passing uncondensed gases toward said suction source, disposing of said gases as desired, cooling condensate removed from said condensing zone and cycling it to each of said sprays.

17. A method for distilling a hydrocarbon oil comprising gas oil and residual oil constituents which comprises preheating said oil, flashing said oil into the upper portion of a stripping zone, introducing into a lower portion of said stripping zone a stripping steam, stripping downwardly flowing oil in said zone, obtaining an overhead from said zone comprising a light gas oil and steam, recovering said light gas oil, obtaining from said stripper a bottoms stream of stripped oil, spraying said oil downwardly into the lower end of a substantially vertically disposed elongated flashing zone, therein flashing the oil producing a non-vaporized residual liquid and upwardly rising vapors, withdrawing unvaporized residue from the bottom of said flashing zone, cycling at least a portion of said residue to the bottom end of said stripping zone, conducting said upwardly rising vapors a substantial distance upwards and then turning said vapors without substantial diminution of the cross-section of the same through about a 90° angle, thus obtaining vapors travelling substantially horizontally, passing said vapors through a condensing spray zone located in a substantially vertically disposed condensing zone and spraying condensing oil consisting essentially of priorly-obtained, now-cooled condensate in substantially the direction of travel of said vapors, causing said spray and now-condensing vapors intermingled therewith to impinge upon one side of an impingement element dividing said condensing zone and extending from its top to a point below the lowest point at which vapors enter said condensing zone, withdrawing condensed liquid from the bottom of said condensing zone, passing uncondensed vapors around the bottom of said impingement element and upwardly on the other side thereof towards a suction source, spraying a cold condensing spray of liquid consisting essentially of earlier-obtained condensate into said upwardly rising uncondensed vapors, thus obtaining a further amount of condensate which is withdrawn, passing uncondensed gases toward said suction source, disposing of said gases as desired, cooling condensate removed from said condensing zone and cycling it to each of said sprays.

18. A method for distilling a hydrocarbon oil which comprises preheating said oil, spraying said oil downwardly into the lower end of a substantially vertically disposed elongated flashing zone, therein flashing the oil producing a non-vaporized residual liquid and upwardly rising vapors, withdrawing unvaporized residue from the bottom of said flashing zone, conducting said upwardly rising vapors a substantial distance upwards and then turning said vapors without substantial diminution of the cross-section of the same through about a 90° angle, thus obtaining vapors travelling substantially horizontally, passing said vapors through a condensing spray zone located in a substantially vertically disposed condensing zone and spraying condensing oil consisting essentially of priorly-obtained, now-cooled condensate in substantially the direction of travel of said vapors, causing said spray and now-condensing vapors intermingled therewith to impinge upon one side of an impingement element dividing said condensing zone and extending from its top to a point below the lowest point at which vapors enter said condensing zone, withdrawing condensed liquid from the bottom of said condensing zone, passing uncondensed vapors around the bottom of said impingement element and upwardly on the other side thereof towards a suction source, spraying a cold condensing spray of liquid consisting essentially of earlier-obtained condensate downwardly into said upwardly rising uncondensed vapors, thus obtaining a further amount of condensate which is withdrawn, passing uncondensed gases toward said suction source, disposing of said gases as desired, cooling condensate removed from said condensing zone and cycling it to each of said sprays.

19. A method for distilling a distillable material which comprises spraying said material into the lower end of a substantially vertically disposed elongated flashing zone, therein flashing said material producing a non-vaporized residual liquid and upwardly rising vapors, withdrawing unvaporized residue from the bottom of said flashing zone, conducting said upwardly rising vapors a substantial distance upwards and then turning said vapors without substantial diminution of the cross-section of the same through about a 90° angle, thus obtaining vapors travelling substantially horizontally, passing said vapors through a condensing spray zone located in a substantially vertically disposed condensing zone and spraying condensing fluid in substantially the direction of travel of said vapors, causing said spray and now-condensing vapors intermingled therewith to impinge upon one side of an impingement element dividing said condensing zone and extending from its top to a point below the lowest point at which vapors enter said condensing zone, withdrawing condensed liquid from the bottom of said condensing zone, passing uncondensed vapors around the bottom of said impingement element and upwardly on the other side thereof towards a suction source, spraying a cold condensing spray of liquid downwardly into said upwardly rising uncondensed vapors, thus obtaining a further amount of condensate which is withdrawn, passing uncondensed gases toward said suction source, and disposing of said gases as desired.

20. A method for distilling a distillable material which comprises preheating said material, flashing said material into the upper portion of a stripping zone, introducing into a lower portion of said stripping zone a stripping medium, stripping downwardly flowing material in said zone, obtaining a light material overhead from said zone, recovering said light material, obtaining from said stripper a bottoms stream of stripped material, spraying said material downwardly into the lower end of a substantially vertically disposed elongated flashing zone, therein flashing said material producing a non-vaporized residual liquid and upwardly rising vapors, withdrawing unvaporized residue from the bottom of said flashing zone, conducting said upwardly rising vapors a substantial distance upwards and then turning said vapors without substantial diminution of the cross-section of the same through about a 90° angle, thus obtaining vapors travelling substantially horizontally, passing said vapors through a condensing spray zone located in a substantially vertically disposed condensing zone and spraying condensing fluid in substantially the direction of travel of said vapors, causing said spray and now-condensing vapors intermingled therewith to impinge upon one side of an impingement element dividing said condensing zone and extending from its top to a point below the lowest point at which vapors enter said condensing zone, withdrawing condensed liquid from the bottom of said condensing zone, passing uncondensed vapors around the bottom of said impingement element and upwardly on the other side thereof towards a suction source, spraying a cold condensing spray into said upwardly rising uncondensed vapors, thus obtaining a further amount of condensate which is withdrawn, passing uncondensed gases toward said suction source, and disposing of said gases.

21. A method according to claim 20 wherein at least a portion of withdrawn unvaporized residue from the bottom of said flashing zone is cycled to the bottom end portion of said stripping zone.

References Cited in the file of this patent

UNITED STATES PATENTS

| Number | Name | Date |
|---|---|---|
| 311,543 | Strain | Feb. 3, 1885 |
| 1,824,780 | Jones | Sept. 29, 1931 |
| 1,844,890 | Miller | Feb. 9, 1932 |
| 1,892,534 | Rembert | Dec. 27, 1932 |
| 2,774,723 | Moyer | Dec. 18, 1956 |
| 2,875,139 | Little | Feb. 24, 1959 |